Jan. 23, 1973
J. L. ORNSTEIN
3,712,799
COMPOSITE THERMOSTAT MATERIAL
Filed Dec. 21, 1970
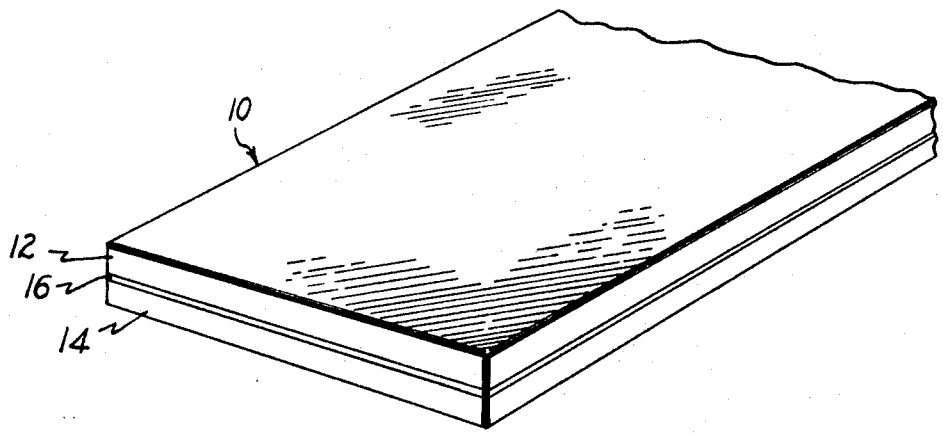
INVENTOR.
BY *Jacob L. Ornstein*

United States Patent Office 3,712,799
Patented Jan. 23, 1973

3,712,799
COMPOSITE THERMOSTAT MATERIAL
Jacob L. Ornstein, Norton, Mass., assignor to Texas Instruments Incorporated, Dallas, Tex.
Filed Dec. 21, 1970, Ser. No. 100,006
Int. Cl. B23p 3/00
U.S. Cl. 29—195.5                      1 Claim

ABSTRACT OF THE DISCLOSURE

A relatively low cost, multi-layer composite thermostat material is disclosed having preselected electrical resistivity and flexivity characteristics including first and second outer layers of metallic alloys having relatively high and relatively lower coefficients of thermal expansion and an intermediate layer of a ferrous alloy. The first outer layer of metallic alloy comprises a material comprising by weight approximately 71% to 76% manganese, 9% to 19% copper, and 9% to 17% nickel, while the second outer layer comprises a metallic alloy such as the material commonly referred to as Invar, which comprises by weight approximately 35½% to 36½% nickel and the balance iron. The first and second outer layers are metallurgically bonded to respective opposite surfaces of the ferrous intermediate layer. The various layers comprising the composite material cooperate to define an extremely economical, composite thermostat material having resistivity characteristics suitable for many applications, while having requisite characteristics of flexivity, useful deflection temperature range, structural strength and ability to withstand high temperatures comparable to previously available thermostat materials only obtainable at substantially higher costs.

---

The present invention relates generally to thermostat materials and more particularly is directly to an improved composite thermostat material.

Many widely used composite thermostat materials comprise bimetal structures including two layers of metallic alloy suitably attached to each other, one of the layers having a relatively high coefficient of thermal expansion and the other of the layers having a relatively low coefficient of thermal expansion. By suitably selecting the characteristics of the layers, a thermostat material may be provided having desired resistivity and flexivity characteristics as well as having other desired properties depending upon the ultimate use of the composite. For example, in certain applications a relatively high level of resistivity is required of the order of 625 to 725 ohms per circular mil foot, while a flexivity of the order of approximately $200 \times 10^{-7}$ to $220 \times 10^{-7}$ inch per inch per degree Fahrenheit is desired over a temperature range of perhaps several hundred degrees Fahrenheit. In order to achieve such characteristics, the two layers of material comprising the bimetal structure, ordinarily are fabricated of materials which may be relatively expensive and, in certain instances, in relatively short supply. However, in certain applications, although the previously specified flexivity may be desirable, a substantially lower resistivity of the order of between approximately 300 to 325 ohms per circular mil foot may be satisfactory. Thus, substantial cost savings may result by replacing portions of the relatively expensive and/or scarce metallic alloys, utilized in forming the bimetal thermostat material, with less expensive ferrous alloys so as to achieve a multi-layer composite material having the requisite flexivity, as well as other desired properties, while the substantially decreased resistivity does not affect its usefulness for the particular applications. Furthermore, in view of the increasing scarcity and attendant cost increases in certain of the materials, such as nickel and copper, typically utilized as constituents in many thermostat metal composites, the necessity for replacing such materials to the extent possible with more readily available, less expensive materials has become extremely important in recent years.

Accordingly, it is an object of the present invention to provide an improved composite thermostat material having desired properties of flexivity, resistivity, corrosion-resistance, strength, etc., in which the usage of certain materials is minimized.

It is a further object of the present invention to provide an improved composite thermostat material which is durable in use and economical to fabricate.

Various additional objects and advantages of the present invention will become readily apparent from the following detailed description and accompanying drawing wherein:

The sole drawing is a perspective view of the composite thermostat material of the present invention.

Referring to the drawing, a strip of composite thermostat material is illustrated and indicated generally by the reference numeral 10. The composite thermostat material 10 includes a first outer layer 12 of a preselected metallic alloy having a relatively high coefficient of thermal expansion, a second outer layer 14 of another preselected metallic alloy having a relatively lower coefficient of thermal expansion and an intermediate layer 16 of a preselected ferrous alloy. The first and second outer layers 12 and 14 are metallurgically bonded, preferably solid-phase bonded, to the opposed surfaces of the intermediate layer 16, the bonds between the various metallic layers extending substantially throughout the entire contiguous surfaces of the layers of the material. Preferably, the various metallic layers are solid-phase bonded together in the manner described, for example, in U.S. Pats. Nos. 2,691,815 and 2,753,623. However, if desired, various other bonding techniques may be employed for metallurgically bonding the layers together within the scope of the present invention. Thus, the illustrated composite thermostat material 10 comprises an integral unit adapted to flex in response to temperature changes as will be understood by those skilled in the art.

In the illustrated embodiment, the first outer layer of the composite material preferably comprises a first preselected metallic alloy comprising by weight approximately 71% to 76% manganese, 9% to 19% copper, and 9% to 17% nickel. The second outer layer 14 preferably comprises a second preselected metallic alloy having a substantially lower coefficient of thermal expansion than the first outer layer 12, and preferably comprises another metallic alloy, such as the material commonly referred to as Invar, which comprises by weight approximately 35½% to 36½% nickel and the balance iron. Furthermore, in accordance with the present invention, in order to save expense and to minimize the usage of relatively scarce materials, the intermediate layer 16 is provided to directly replace a portion of the volume of the composite 10 which would otherwise be occupied by the first and second outer layers 12 and 14, and preferably comprises a readily available, inexpensive ferrous alloy. Thus, the usage of relatively more expensive, less available materials may be substantially reduced. In this regard, a wide variety of ferrous alloys may be utilized in providing the intermediate layer 16 and similarly the thickness of the intermediate layer, relative to the thickness of the overall composite, may vary substantially depending on desired properties such as resistivity, flexivity, etc. of the composite material, which in turn are arranged to satisfy the particular application for which the material is to be utilized.

In this regard, it has been found that various low carbon steels, stainless steels, etc. are suitable for use in defining the intermediate layer 16. More particularly, in one preferred embodiment of the present invention, the intermediate layer comprises a material, such as the material commercially identified as SAE (Society of Automotive Engineers) No. 1006 Low Carbon Steel, which comprises by weight approximately 0.08% maximum carbon, 0.25% to 0.45% maximum manganese, 0.040% maximum phosphorous and 0.050% maximum sulphur. It has been found that by utilizing such a material the intermediate layer 16 may vary in thickness over a range of between approximately 10% to 30% of the total thickness of the composite material, while the first and second outer layers 12 and 14 comprise the first and second preselected metallic alloys originally described, and are of substantialy equal thickness with respect to each other, defining the remaining thickness of the composite material. This embodiment of the composite thermostat material may have a resistivity in the range of between approximately 300 to 325 ohms per circular mil foot, while the flexivity of the composite material may vary between approximately $200 \times 10^{-7}$ to $220 \times 10^{-7}$ inch per inch per degree Fahrenheit. The resultant composite in accordance with the present invention thus is substantially more economical and provides similar flexivity characteristics as compared with conventionally available bimetal thermostat materials, including materials, the constituents of which may be relatively scarce and expensive. Although the conventional bimetal composite thermostat material may have a resistivity approximately twice as large as the resistivity of a composite thermostat material in accordance with the present invention, in many instances, the relatively higher resistivity is unnecessary and accordingly a substantial advantage is provided in view of the significant cost and material savings which result by minimizing the use of the more expensive materials, comprising the first and second outer layers 12 and 14 by replacing a portion of the volume which would be occupied by these materials with a less expensive ferrous alloy such as No. 1006 Low Carbon Steel. In this regard, it may be noted that the intermediate layer 16 may be defined by a wide variety of ferrous alloys which are low in cost relative to the first and second outer layers and which do not affect the resistivity and flexivity characteristics of the composite material to a degree which makes the composite unsuitable for the desired end use.

More particularly, in accordance with one example of the present invention which has been fabricated, the first and second outer layers 12 and 14, as well as the intermediate layer 16 comprise the respective alloys previously described in detail, while the thickness of the intermediate layer comprises approximately 14.5% of the total thickness of the composite material, the first outer layer has a thickness comprising approximately 45.5% of the total thickness of the composite material, and the second outer layer 14 has a thickness comprising approximately 40% of the total thickness of the composite material. In such an example, it has been found that the resisitivy is approximately 300 ohms per circular mil foot, while the flexivity is approximately $206 \times 10^{-7}$ inch per inch per degree Fahrenheit over a temperature range of between approximately 50° Fahrenheit to 200° Fahrenheit. Such a material has been found to be extremely low in cost in comparison with previously mentioned conventional bimetal materials, while having suitable characteristics for many usages. It has further been found that such a material may be successfully fabricated in thicknesses varying from approximately .003" to .125", while retaining the requistie flexivity and resistivity characteristics described above. In addition, in this example, the coefficient of thermal expansion of the first preselected material comprising the first outer layer 12, which, as previously indicated, is relatively high, preferably comprises approximately $15 \times 10^{-6}$ inch per inch per degree Fahrenheit, while the coefficient of thermal expansion of the second preselected material comprising the second outer layer 14, which is relatively lower, preferably comprises approximately $0.7 \times 10^{-6}$ inch per inch per degree Fahrenheit. Thus there is a difference of approximately an order of magnitude between the coefficients of thermal expansion of the first and second outer layers 12 and 14 so as to define a composite thermostat material having desired temperature responsive properties providing a useful deflection characteristic over a relatively wide temperature range. Furthermore, these materials may be readily secured together utilizing suitable roll bonding techniques, or the like, while achieving accurate control over overall layer thickness in the resulting composite material. In this regard, it may be noted that although the composite material may be made available in overall thickness ranges of between 0.003" to 0.125", which comprises a suitable range for most thermostat applications, other thicknesses also may be readily provided, if desired. Thus, the preferred composite thermostat material described hereinabove may be seen to be characterized by useful properties in terms of flexivity, resistivity, ease in processing, significantly lower cost, and minimal use of relatively scarce and/or expensive materials.

Various additional changes and modifications in the above described embodiment will be readily apparent to those skilled in the art and any of such changes or modifications are deemed to be within the spirit and scope of the present invention as set forth in the appended claim.

What is claimed is:

1. A composite thermostat material comprising a first outer layer of a first preselected metallic alloy having a relatively high coefficient of thermal expansion and comprising by weight approximately 71% to 76% manganese, 9% to 19% copper, and 9% to 17% nickel, a second outer layer of a second preselected metallic alloy having a relatively lower coefficient of thermal expansion than said first preselected metallic alloy and comprising by weight approximately 35½% to 36½% nickel and the balance iron, and an intermediate layer of a preselected ferrous alloy comprising by weight approximately 0.08% (max.) carbon, 0.25 to 0.45% manganese, 0.040% (max.) phosphorus, 0.050% (max.) sulfur and the balance iron, said intermediate layer having a thickness comprising from 10% to 30% of the total thickness of said composite material and being solid-phase bonded to each of said first and second layers, said first and second layers having selected thicknesses providing said composite material with a resistivity of between approximately 300 to 325 ohms per circular mil foot and a flexivity of between approximately $200 \times 10^{-7}$ to $220 \times 10^{-7}$ inch per inch per degree Fahrenheit.

References Cited

UNITED STATES PATENTS

| 2,470,753 | 5/1949 | Alban | 29—195.5 |
| 3,219,423 | 11/1965 | Sears | 29—195.5 X |

L. DEWAYNE RUTLEDGE, Primary Examiner

J. E. LEGRU, Assistant Examiner

U.S. Cl. X.R.

29—196.1